United States Patent [19]
Mihm et al.

[11] Patent Number: 5,100,170
[45] Date of Patent: Mar. 31, 1992

[54] AUTO-IGNITION DEVICE FOR AN AIR BAG INFLATOR

[75] Inventors: Joseph J. Mihm, North Branch; Ponget P. Wipasuramonton, Rochester, both of Mich.; James M. Kumkoski, Mesa, Ariz.

[73] Assignee: TRW Vehicle Safety Systems Inc., Lyndhurst, Ohio

[21] Appl. No.: 643,755

[22] Filed: Jan. 22, 1991

[51] Int. Cl.⁵ .............................................. B60R 21/32
[52] U.S. Cl. ...................................... 280/735; 280/736
[58] Field of Search .............. 280/734, 735, 728, 736; 180/271; 102/481

[56] References Cited

U.S. PATENT DOCUMENTS

| | | | |
|---|---|---|---|
| 2,805,272 | 9/1957 | Postal | 136/4 |
| 2,949,594 | 8/1960 | Tava et al. | 338/26 |
| 3,048,643 | 8/1962 | Winckler et al. | 136/4 |
| 3,246,311 | 4/1966 | Sack | 340/228 |
| 4,561,675 | 12/1985 | Adams et al. | 280/734 |
| 4,806,180 | 2/1989 | Goetz et al. | 149/5 |
| 4,858,951 | 8/1989 | Lenzen | 280/741 |

OTHER PUBLICATIONS

"Development of a Low Melting Electrolyte System for a LiAl/Ag₂CrO₄ Battery" by Bolster, et al., Abstract from Electro. Society Meeting, Oct., 1989.

Primary Examiner—Charles A. Marmor
Assistant Examiner—Paul Dickson
Attorney, Agent, or Firm—Calfee Halter & Griswold

[57] ABSTRACT

An air bag inflator is provided with a new and useful auto-ignition device. The auto-ignition device comprises a thermoelectric battery, preferably located outside of the inflator housing. The thermoelectric battery is adapted to become electrochemically active in a predetermined temperature range (e.g. 300°–400° F.), and to provide an electrical signal which actuates the inflator.

9 Claims, 3 Drawing Sheets

AUTO-IGNITION DEVICE FOR AN AIR BAG INFLATOR

FIELD OF THE INVENTION

This invention relates generally to an auto-ignition device for an air bag inflator and, more particularly, to a thermoelectric auto-ignition device for use with an inflator having a housing made of aluminum.

BACKGROUND OF THE INVENTION

A vehicle air bag system functions to protect a vehicle occupant during a collision. The principal components of a vehicle air bag system are an inflatable air bag and an inflator (or gas generator). At the onset of a collision, the inflator rapidly generates an inert, non-toxic gas (e.g., nitrogen) to inflate the air bag. The inflator is designed to generate a sufficient quantity of gas in a short enough time span to inflate the air bag within milliseconds of the onset of a collision.

A known inflator structure is disclosed in U.S. Pat. No. 4,806,180. The inflator structure comprises a housing containing a gas generant and an initiator for igniting the gas generant in response to a collision signal. The initiator comprises a squib with a housing containing an ignition material and a pyrotechnic material. A bridge wire is located within the squib housing, and is in contact with the ignition material. The bridge wire forms part of an electric sensing circuit. At the onset of a collision, a crash sensor completes the electric sensing circuit, causing electrical current to flow through the bridge wire to ignite the ignition material. In turn, the ignition material ignites the pyrotechnic material. The pyrotechnic material generates hot gases and flame which rupture the squib housing and ignite the gas generant. The gas generant rapidly generates large quantities of a non-toxic, inert gas (e.g., nitrogen), which is expelled from the inflator housing and used to inflate an air bag.

Under certain environmental conditions, an air bag inflator may be exposed to ambient temperatures which are high enough to cause ignition of the gas generant. For example, an inflator could be exposed to such high temperature conditions if it is engulfed by a fire while it is (i) in storage, (ii) being shipped to an installation site, or (iii) installed in a vehicle.

In the air bag art, it is desirable to "set off" an inflator before it is exposed to ambient temperatures which are high enough to ignite the gas generant. Accordingly, it is generally suggested that "auto-ignition" of the gas generant in an inflator occur when ambient temperatures reach a range of about 300°–400° F. This temperature range is below the ignition temperature of gas generant currently being used in vehicle air bag inflators. Moreover, this temperature range is high enough to avoid unintended auto-ignition of the gas generant.

One technique for triggering auto-ignition of the gas generant in an aluminum air bag inflator at a temperature of about 350° F. is shown in U.S. Pat. No. 4,561,675 to Adams, et al., entitled "Auto-ignition Device" and issued Dec. 31, 1985. In the Adams, et al. patent, an electric squib and a pyrotechnic material form a primary ignition train. A package of an auto-ignition material is disposed inside the inflator housing, in good thermal contact with the inflator housing. When the auto-ignition material reaches a predetermined temperature, the auto-ignition material ignites, burns through the package, and ignites the gas generant or the pyrotechnic material to set off the inflator. In the Adams, et al. patent, four factors necessary for effective auto-ignition of the inflator are (i) direct sensing of ambient temperature by the inflator housing, (ii) rapid conduction of heat through the inflator housing, (iii) good heat transfer between the inflator housing and the package of auto ignitable material, and (iv) location of the package of auto-ignition material proximate to the gas generant or the pyrotechnic material within the housing.

Another technique for triggering auto-ignition of the gas generant in an air bag inflator when ambient temperatures are in a range of about 300°–400° F. is shown in U.S. Pat. No. 4,858,951. A homogeneous mixture of booster material and auto-ignition material is incorporated into an initiator housing and forms part of the primary ignition train of the inflator. When the initiator housing reaches a temperature of about 300°–400° F., the auto-ignition material ignites, and sets off the inflator.

SUMMARY OF THE INVENTION

The present invention provides new and useful ways for providing auto-ignition of gas generant material in an air bag inflator.

According to one aspect of the invention, an auto-ignition sensing device is provided outside of the inflator housing. The sensing device is adapted to set off the gas generant in the inflator when the temperature outside the inflator reaches a predetermined level. Specifically, the auto-ignition sensing device is attached to the exterior of the inflator housing or is positioned remote from the inflator housing. In either case, the auto-ignition sensing device directly senses the ambient temperature. When that temperature reaches a range of about 300°–400° F., the auto-ignition sensing device actuates an initiator in the inflator to set off the gas generant in the inflator Thus, auto-ignition of the gas generant is not affected by the design criteria and/or the thermal conductivity of the inflator housing. Moreover, when the auto-ignition sensing device is located remote from the inflator, auto-ignition of the inflator can be initiated before the inflator is engulfed by a fire or otherwise directly exposed to a high temperature environment.

According to another aspect of the invention, a preferred auto-ignition sensing device comprises a thermoelectric battery. The thermoelectric battery is connected to a bridge wire which forms part of a primary ignition train that sets off the gas generant in the inflator in the event of a collision. When the ambient temperature about the thermoelectric battery reaches a predetermined level (e.g. about 300°–400° F.), the thermoelectric battery becomes electrochemically active and directs a current flow to the bridge wire to set off the inflator.

BRIEF DESCRIPTION OF THE DRAWINGS

Further features of the present invention will become apparent from the following detailed description and the accompanying drawings.

DETAILED DESCRIPTION OF THE PREFERRED EMBODIMENT

Figure 1:
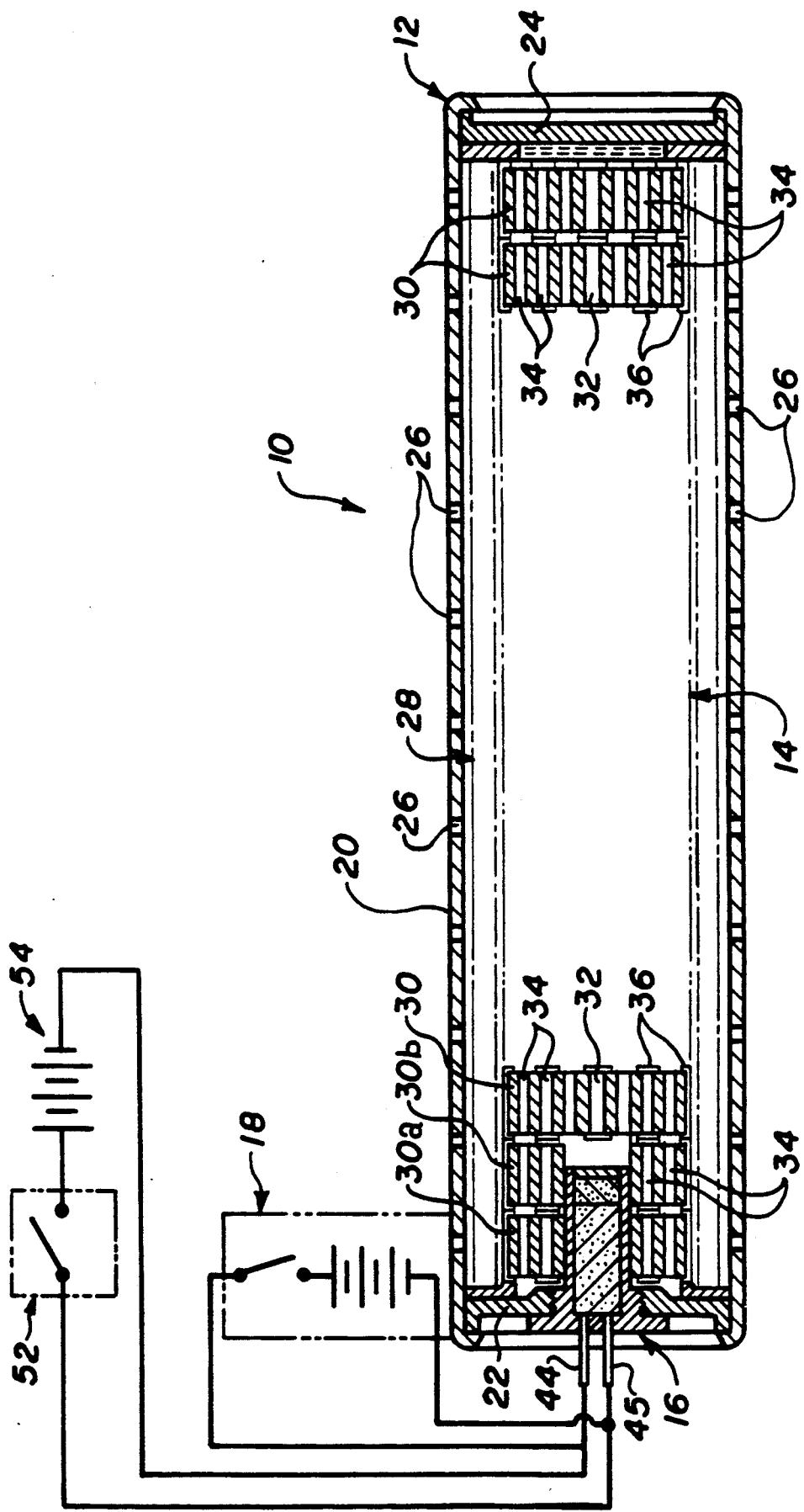
FIG. 1 is a sectional view of an air bag inflator and a schematic illustration of an auto-ignition sensing device attached to the inflator housing, according to one embodiment of the present invention.

In FIG. 1, an air bag inflator 10 comprises a housing 12 containing a gas generant 14 and an initiator 16 which is actuated at the onset of a collision to ignite the gas generant 14. An auto-ignition sensing device 18 is located on the outside of the inflator housing 12. The auto-ignition sensing device 18 is adapted to sense the ambient temperature outside of the housing 12 and to actuate the initiator 14 when the temperature reaches a predetermined range, as described more fully hereinafter.

The inflator housing 12 includes a tubular main body 20 and a pair of end caps 22, 24 closing the opposite ends of the main body 20. Gas dispensing nozzles 26 are formed in the main body 20 around at least a portion of its circumference. The inflator housing 12 can be made of metal, such as steel or aluminum, or any other material that can withstand the heat and pressure produced by ignition of the gas generant 14.

A filter structure 28 is disposed within the cylindrical main body 20 between the gas generant 14 and the gas dispensing nozzles 26. The filter structure 28 comprises a plurality of layers of wire mesh, steel wool, and fiberglass. When the gas generant 14 is ignited, the resulting gas is directed through the filter structure 28 and then through the gas dispensing nozzles 26 in the inflator housing 12. The filter structure 28 is designed to prevent particles of hot materials from being directed out of the inflator housing 12

The gas generant 14 includes a plurality of cylindrical grains 30, each formed of a material which, when ignited, generates an inert, non-toxic gas (e.g., nitrogen). Two of the cylindrical grains 30a, 30b, encircle the initiator 16. The remaining cylindrical grains 30 have aligned central passages 32 which extend through the grains. Additional passages 34 extend through all of the grains 30 at positions radially offset from the central passages 32. The grains 30 also have projections 36 which space the grains from each other to allow efficient flow of gas through and away from the grains. The passages 32, 34 in the grains and the spacing of the grains are designed to produce a predetermined burning rate of the grains 30. The grains 30 are preferably formed of an alkali metal azide composition, as disclosed in U.S. Pat. No. 4,817,828, which is a preferred composition.

Figure 3:
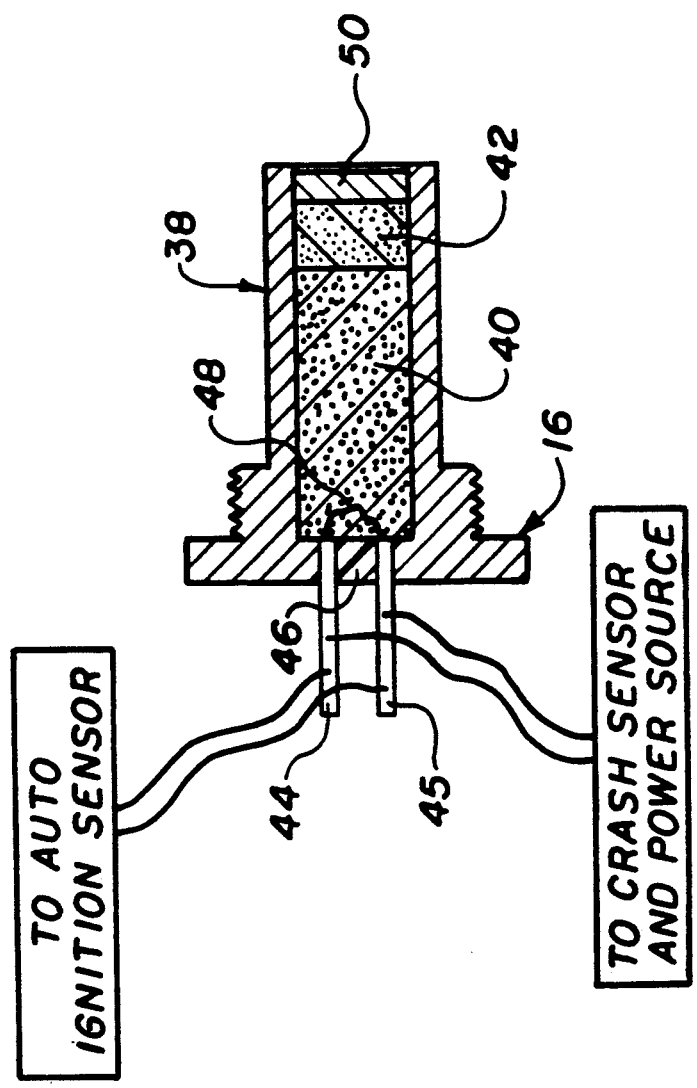
FIG. 3 is an enlarged, sectional view of an initiator for an inflator with an auto-ignition sensing device according to either of the foregoing embodiments.

The initiator 16 (FIG. 3) comprises a generally tubular housing 38 that contains an ignition material 40 and a pyrotechnic material 42 therein at the end of the housing 38 encircled by the grains. A burst disk 50 closes the housing and covers the pyrotechnic material 42 and the ignition material 40. The other end of the housing is closed by an insulating header 46. A pair of conductor pins 44, 45 extend through the insulating header 46. A resistance wire (or bridge wire) 48 is embedded in the ignition material 40 adjacent the insulating header 46. One end of the bridge wire 48 is connected to an end of the conductor pin 44. The other end of the bridge wire 48 is connected to an end of the conductor pin 45.

The bridge wire 48 forms part of an electric circuit which sets off the inflator 10 at the onset of a collision. The circuit includes an inertia switch 52 and a power source 54. The inertia switch 52 and the power source are connected in series with the bridge wire 48. The inertia switch 52 is designed to sense the onset of a vehicle collision and to close so as to complete the circuit. When the circuit is closed, an electrical current of a predetermined magnitude flows through the bridge wire 48 to ignite the ignition material 40 and thereby to set off the initiator 16.

In the initiator 16, the ignition material 40 preferably comprises a zirconium potassium perchlorate mixture. When electrical current of the predetermined magnitude is applied to the bridge wire 48, the bridge wire 48 is rapidly heated to ignite the ignition material. The heat generated by ignition of the ignition material ignites the pyrotechnic material 42. The pyrotechnic material 42 may be any one of a number of different materials, such as titanium potassium chlorate, or zirconium potassium chlorate. The pyrotechnic material 42 generates hot flame and gas which ruptures the burst disk 50 and ignites the cylindrical grains 30 of the gas generant 14.

According to the present invention, the auto-ignition sensing device 18 senses ambient temperature conditions. When those conditions reach a predetermined temperature range (e.g., 300°–400° F.), the auto-ignition sensing device 18 causes an electrical current of a predetermined magnitude to be applied to the bridge wire 48. Such electrical current will ignite the ignition material 40 in the initiator 16 and will actuate the inflator 10 in the same manner as closing the inertia switch 52.

According to the preferred embodiment, the auto-ignition sensing device 18 comprises a thermoelectric battery. The thermoelectric battery can be connected to the exterior of the inflator housing 42, as shown schematically in FIG. 1. Alternatively, the thermoelectric battery can be located remote from the inflator housing 12, as illustrated schematically in FIG. 2.

Essentially, a thermoelectric battery for use in accordance with the present invention should become electrochemically active when the ambient temperature reaches the predetermined 300°–400° F. range. When active, the battery should enable current to flow between its two opposite poles. The thermoelectric battery should generate an output voltage of about 5–6 volts to generate the current in the bridge wire 48 needed to set off the ignition material 40.

It has been discovered that a thermoelectric battery with an LiAl power anode, a graphite doped $Ag_2CrO_4$ cathode, and an electrolyte principally comprising lithium nitrate and lithium chloride (specifically a LiCl-$LiNO_3$-$NaNO_2$ electrolyte) becomes electrochemically active at about 300° F. Such a thermoelectric battery is disclosed in a paper entitled "Development of a Low Melting Electrolyte System for a $LiAl/Ag_4CrO_4$ Battery" by Mary-Elizabeth Bolster, Janet Embry, James Foxwell and Robert J. Staniewicz, and published as *Abstract No. 97-1989 Journal of the Electrochemical Society*, pp. 147, 148 (the "JES paper"). The single cell tests on the electrolyte systems shown in Table 1 demonstrated that two particular salts gave superior voltage characteristics as a function of current density.

TABLE 1

| Electrolyte Salt | Mole Percent Composition | Literature mo °F.(3,4) | Fused | DSC mo °F. | Single Cell Tests |
|---|---|---|---|---|---|
| 1. LiNO$_3$KNO$_3$ + | 43-57 | 265.2 | Yes | 249 | Yes |
| 10 wt % LiCl | 38-51-11 | N/A | Yes | 234 | No |
| 20 wt % LiCl | 36.5-48.5-15 | N/A | Yes | 327 | No |
| 20 wt % LiCl + | 33-44-15-8 | N/A | Yes | 327 | No |
| 10 wt % NaNO$_2$ | | | | | |
| 20 wt % LiCl + | 27-35-24-14 | N/A | Yes | 336.6 | No |
| 20 wt % NaNO$_2$ | | | | | |
| 2. LiNO$_3$—LiCl—KCL | 50-25-25 | N/A | Yes | 330 | Yes, 365° F. |
| 3. LiNO$_3$—NaNO$_2$ + | 35-65 | 300 | Yes | 225 | No |
| 10 wt % LiCl | 30-55-15 | N/A | Yes | 264.6 | Yes |
| 4. LiNo$_3$KNO$_3$ | 60-40 | 270 | Yes | 243, 276 | Yes |
| 5. LiNO$_3$RbNO$_3$ | 30-70 | 298.5 | Yes | 320 | Yes |
| 6. LiNO$_3$—CsNO$_3$—RbNO$_3$ | 42-23-37 | 296.7 | Yes | 314 | Yes |
| 7. LiNO$_3$—CsNO$_3$—RbNO$_3$ | 65-7-29 | 293.1 | No | — | — |
| 8. LiNO$_3$—LiBr—CsNO$_3$ | 41-9-50 | 309.3 | No | — | — |
| 9. LiNO$_3$—NaNO$_3$—LiCl | 80-15-5 | 338 | Yes | 381.2 | No |
| 10. LiNO$_3$—NaNO$_3$ | 62.5-37.5 | 312 | Yes | 253.4, 280 | Yes |

The authors concluded that a series array of 2-4 such batteries, each with 30 mol % LiNO$_3$, 55 mol % NaNO$_3$, and 15 mol % LiCl electrolyte, along with LiAl power anode and a graphite doped Ag$_4$CrO$_4$ cathode, was more than capable of generating a 3.5V/3.5A pulse. Moreover, the authors concluded they had validated that an LiA1/Ag$_4$CrO$_4$ thermal battery, when electrochemically optimized, can meet the applications of low operating temperature with respectable current density and operating potential.

The thermoelectric battery described in the JES paper would provide an auto-ignition signal when exposed to an ambient temperature of 300°-400° F. Moreover, since the battery described in the JES paper would produce an output voltage of between 2.0-3.0 volts, a series arrangement of two to three of the thermoelectric batteries would produce an output voltage (5-6 volts) suitable to cause the bridge wire 48 to ignite the ignition material 40 of the initiator 16. Hence, the thermoelectric battery of the JES paper can be electrochemically optimized to produce the requirements of an auto-ignition sensing device 18 of the present invention.

Figure 2:
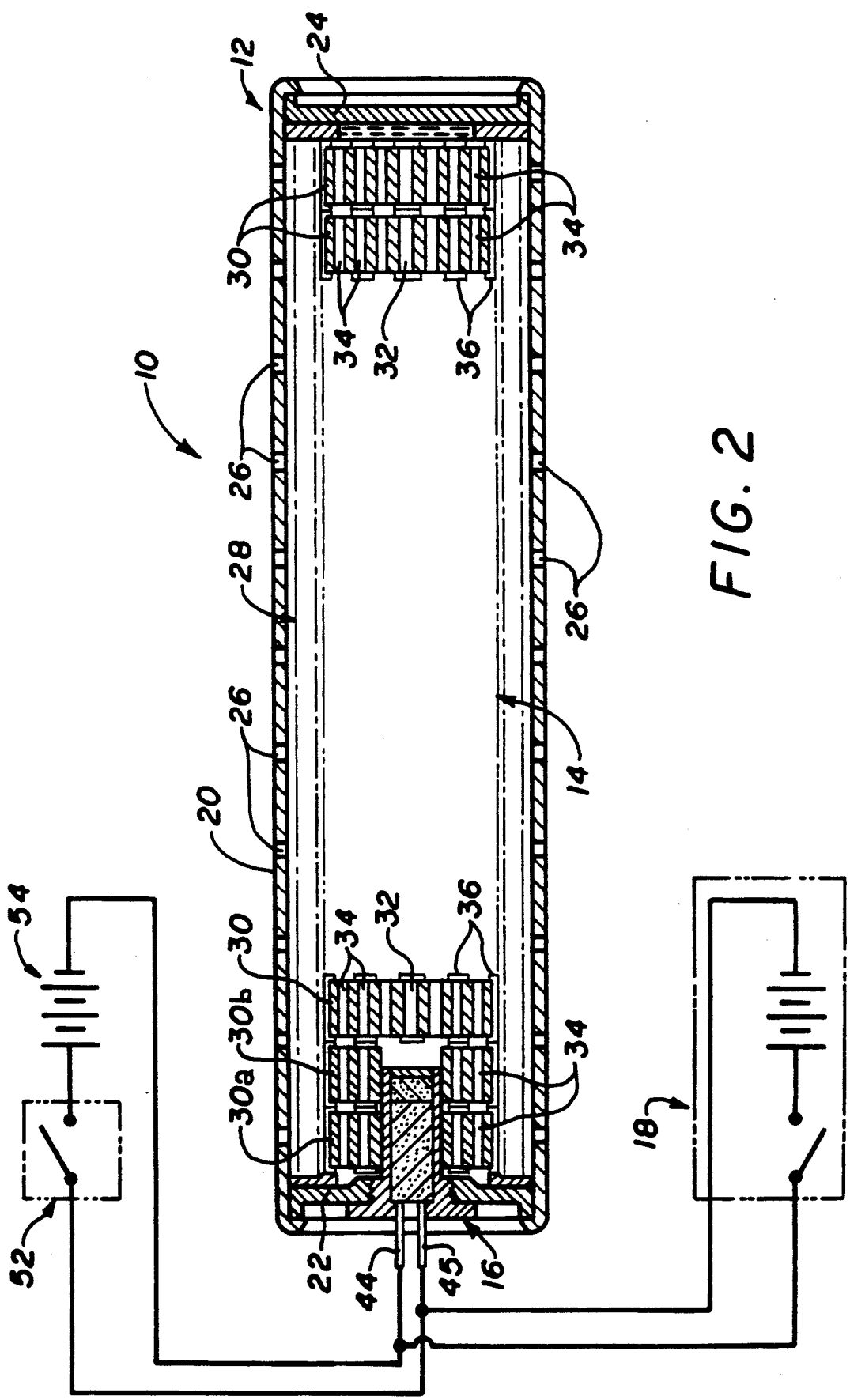
FIG. 2 is a sectional view of an air bag inflator and a schematic illustration of an auto-ignition sensing device located remote from the inflator housing, according to another embodiment of the present invention.

In the embodiments of FIGS. 1 and 2, the auto-ignition sensing device 18 is disposed outside the inflator housing 12. Thus, the thermoelectric sensing device 18 directly senses the ambient temperature outside of the inflator housing 12. Moreover, the thickness and material of the inflator housing 12, which must contain the pressures of ignition of the gas generant 14 are not factors in sensing ambient temperature or transmitting heat to actuate the inflator in an auto-ignition mode. Still further, since the thermoelectric sensing device 18 can be located remote from the inflator housing (FIG. 2), the thermoelectric sensing device may be located so as to "anticipate" an inflator about to become engulfed in a fire and to actuate the inflator before it actually becomes engulfed in the fire.

Additionally, while it is preferred to locate the thermoelectric sensing device outside the inflator housing, the principles of this invention can be used to locate a thermoelectric sensing device within the inflator housing. Such a sensing device might be the only auto-ignition sensor or it might be a "back-up" sensor, in the event of damage to the external sensor or the contacts between the external sensor and the bridge wire. An internal thermoelectric sensing device would rely on heat transfer through the walls of the inflator housing to actuate the sensor. However, once heated to the desired temperature range, the internal thermoelectric sensing device would electrically, rather than thermally, actuate the inflator.

Although the invention has been shown and described with respect to certain preferred embodiments, equivalent alterations and modifications may occur to others skilled in the art upon the reading and understanding of this specification. The present invention includes all such equivalent alterations and modifications, and is limited only by the scope of the following claims.

What is claimed is:

1. Apparatus comprising:
    an air bag inflator comprising a housing and gas generant material disposed in said housing, said gas generant material having a predetermined temperature at which said gas generant material will ignite;
    an initiator engaged with said housing, said initiator being adapted to be actuated by an electrical signal and, upon actuation, to ignite said gas generant; and
    an auto-ignition sensing device located outside of said housing and said initiator, said auto-ignition sensing device being electrically connected with said initiator and being adapted to actuate said initiator when said auto-ignition sensing device senses a predetermined auto-ignition temperature, said predetermined auto-ignition temperature being less than said ignition temperature of said gas generant.

2. Apparatus as set forth in claim i, wherein said initiator includes an element responsive to an electric current for actuating said initiator, and wherein said auto-ignition sensing device comprises a thermoelectric battery adapted to produce an electrical current when said thermoelectric battery is exposed to said predetermined auto-ignition temperature.

3. Apparatus as set forth in claim 2, wherein said thermoelectric battery is attached to an exterior portion of said housing.

4. Apparatus as set forth in claim 3, wherein said thermoelectric battery is positioned remote from said housing.

5. Apparatus as set forth in any of claims 1-4, wherein said housing is made of aluminum.

6. Apparatus as set forth in any of claims 1-4, wherein said predetermined auto-ignition temperature is in the range of 300°-400° F.

7. Apparatus comprising:
an air bag inflator comprising a housing and a gas generant material disposed in said housing, said gas generant material having a predetermined temperature at which said gas generant material will ignite;
an initiator engaged with said housing, said initiator adapted to be actuated by an electrical signal and, upon actuation, to ignite said gas generant, said initiator including an element responsive to an electric current for actuating said initiator; and
an auto-ignition sensing device electrically connected with said initiator and being adapted to actuate said initiator when said auto ignition sensing device senses a predetermined auto ignition temperature, said predetermined auto ignition temperature being less than said ignition temperature of said gas generant, said auto-ignition sensing device comprising a thermoelectric battery adapted to produce an electric current when said thermoelectric battery is exposed to said predetermined auto-ignition temperature.

8. Apparatus as set forth in claim 7, wherein said housing is made of aluminum.

9. Apparatus as set forth in claim 7, wherein said predetermined auto ignition temperature is in the range of 300°-400° F.

* * * * *

UNITED STATES PATENT AND TRADEMARK OFFICE
CERTIFICATE OF CORRECTION

PATENT NO. : 5,100,170

DATED : March 31, 1992

INVENTOR(S) : Joseph J. Mihm, Ponget P. Wipasuramonton, James M. Kumkoski

It is certified that error appears in the above-identified patent and that said Letters Patent is hereby corrected as shown below:

Col. 6, line 54 delete "i" and insert therefor --1--

Signed and Sealed this

Twenty-second Day of June, 1993

Attest:

MICHAEL K. KIRK

*Attesting Officer*  *Acting Commissioner of Patents and Trademarks*